(12) United States Patent
Chinivar et al.

(10) Patent No.: US 9,183,403 B2
(45) Date of Patent: Nov. 10, 2015

(54) KEY RETRIEVAL

(71) Applicant: Hewlett-Packard Development Company, L.P., Houston, TX (US)

(72) Inventors: Santosh G. Chinivar, Santa Clara, CA (US); Subir Parulekar, Santa Clara, CA (US); Lakshminarayana Mandaleeka, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 196 days.

(21) Appl. No.: 13/931,042

(22) Filed: Jun. 28, 2013

(65) Prior Publication Data

US 2015/0006906 A1     Jan. 1, 2015

(51) Int. Cl.
*G06F 21/60* (2013.01)

(52) U.S. Cl.
CPC ................... *G06F 21/606* (2013.01)

(58) Field of Classification Search
CPC ................................... G06F 21/606
USPC ......................................... 713/189
See application file for complete search history.

(56) References Cited

U.S. PATENT DOCUMENTS 6,000,033 A * 12/1999 Kelley et al. ............. 726/8
6,839,437 B1   1/2005 Crane et al.
6,993,661 B1 * 1/2006 Garfinkel ................. 713/193
7,389,429 B1 * 6/2008 Trimberger ............. 713/194
7,549,174 B1 * 6/2009 Falkner et al. ............ 726/29
8,458,494 B1 * 6/2013 Bogorad ................... 713/193
2007/0258585 A1 11/2007 Sandhu et al.
2008/0101610 A1  5/2008 Birk et al.
2009/0110188 A1  4/2009 Garimella et al.
2009/0240936 A1  9/2009 Lambiase et al.
2010/0091994 A1  4/2010 Schiefelbein
2012/0170749 A1  7/2012 Rich et al.

OTHER PUBLICATIONS

Secure plain text passwords in WSO2 Carbon configuration files, Aug. 16, 2012, 4 pages, retrieved from http://xacmlinfo.org/2012/08/12/secure-plain-text-passwords-in-wso2-carbon-configuration-files/ on Feb. 19, 2015.*
Harrison et al. Protecting Cryptographic Keys from Memory Disclosure Attacks, Mar. 23, 2007, 38 pages.*
Pradeep, et al., "Keystore Password", Retrieved from http://www.coderanch.com/t/506544/Security/keystore-password, Aug. 2010, 5 pages.

* cited by examiner

*Primary Examiner* — Saleh Najjar
*Assistant Examiner* — Oleg Korsak
(74) *Attorney, Agent, or Firm* — Brooks, Cameron & Huebsch, PLLC

(57) ABSTRACT

Key retrieval can include accessing a password for a keystore from a source. Key retrieval can include placing the password in memory. Key retrieval can include deleting the password from the source. Key retrieval can include retrieving an encryption key from the keystore with the password in memory.

20 Claims, 4 Drawing Sheets

KEY RETRIEVAL

BACKGROUND

A message can be encrypted to prevent unauthorized access. A message can be encrypted before it is sent and can be decrypted upon reception. Encrypting and Decrypting can prevent unintended recipients of the message from obtaining the contents of the message. A number of encryption schemes can encrypt and/or decrypt based on a key.

DETAILED DESCRIPTION

Figure 1:
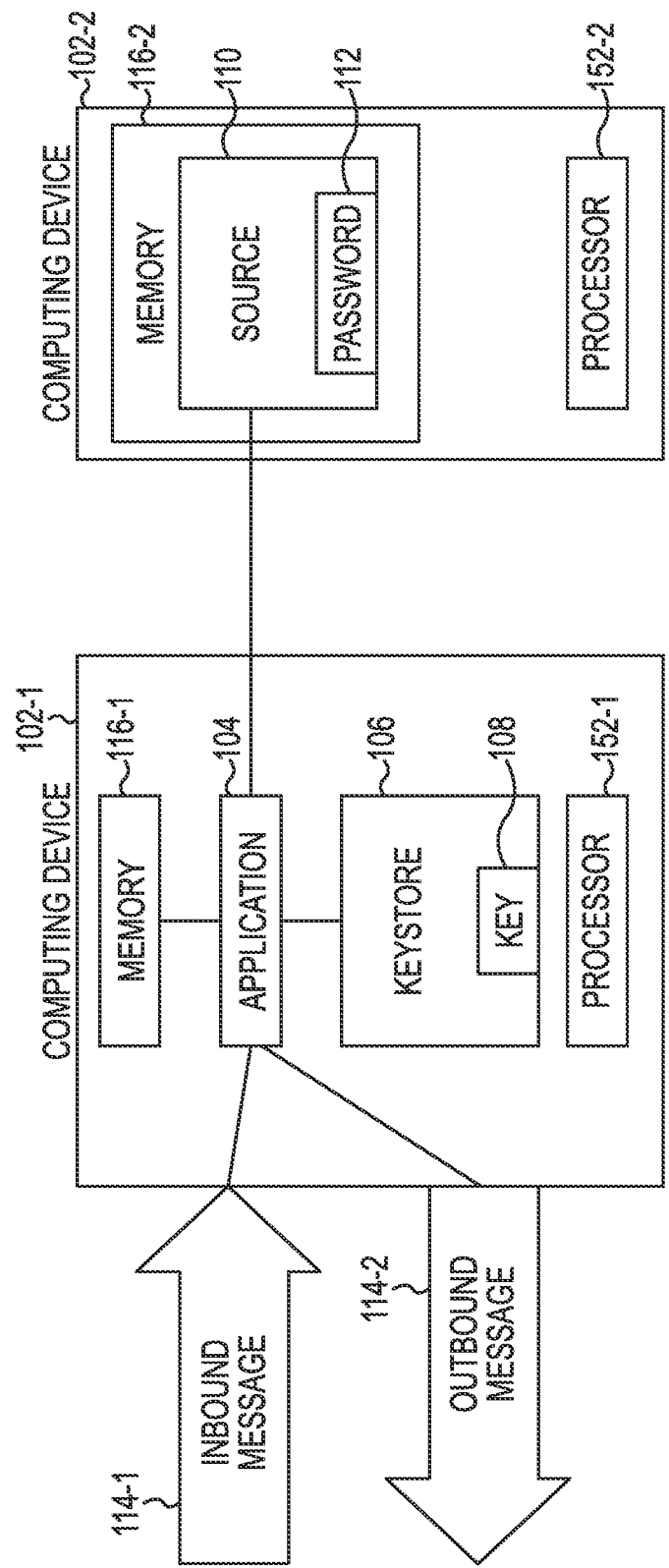
FIG. 1 illustrates a diagram of an example of an environment for key retrieval according to the present disclosure.

Communications between a first application and a second application can be encrypted to prevent third parties from obtaining the content of the communications. Communications can be encrypted using an encryption key. A key can be stored in a keystore to prevent unauthorized parties from obtaining the encryption key. Access to a keystore can be provided through a password. Safeguarding the key upon which an encryption scheme is based can provide for the secure transfer of messages.

According to some examples of the present disclosure, access to a password can be limited by deleting a source where the password is saved and by deleting the password from memory associated with the first application. A password can be obtained from a source. The password can be placed in memory. The password can be deleted from the source and upon use of the password the password can be deleted from memory. Such examples can prevent a third party from obtaining the password from the source and/or from memory.

As used herein, an application refers to machine-readable instructions, e.g., software, firmware, etc., that can be run on a hardware processor, memory, etc., to process a number of communications, e.g., messages. An application can be associated with an authorized user. An authorized user is a user, e.g., Information Technology (IT) personnel that is granted access to a number of resources that are associated with the application. For example, IT personnel can be granted access to the application and to a number of messages that can be encrypted by the application. A third party can refer to a user that has not been authorized access to the number of resources. For example, a third party can be user that is not authorized to access an application but nevertheless tries to gain un-authorized access to the application.

In some previous approaches, a password for a keystore may be saved in a source. The source may be located within a file system. In some previous approaches, access to the password may be limited based on a third party's knowledge of the source's location. That is, a password may be protected based on the location of the password in a file system, e.g., the password is located in an obscure location in the file system. For example, the source may be located in a directory that is only known to an application and not known to the third party and as a result the application may access the source and the third party may not access the source. However, the password may be vulnerable because the source may be accessed by the third party upon the third party obtaining knowledge of the location of the source. The third party may search through the file system for the source until the source is obtained, for instance. The third party, once the source is obtained, may use the source to obtain the password to the keystore and the encryption key to decrypt and/or encrypt messages that are associated with the application. Furthermore, the third party may send encrypted messages in proxy of the application. In contrast, in a number of examples of the present disclosure, a password can be deleted from the source and from memory associated with the application to prevent third parties from accessing the keystore.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 illustrates a diagram of an example of an environment for key retrieval according to the present disclosure. FIG. 1 includes a computing device 102-1, a computing device 102-2, an application 104, and a keystore 106.

A computing device 102-1 can include a memory 116-1, a processor 152-1, an application 104, and a keystore 106 among other hardware and/or software components. In a number of examples, a memory 116-1, a processor 152-1, an application 104, and/or a keystore 106 can be included in a number of different computing devices. The application 104 can receive an in-bound message 114-1 and can send an out-bound message 114-2 via computing device 102-1. The in-bound message 114-1 and/or the out-bound message 114-2 can contain sensitive data that can be protected from unauthorized access. The application 104 can encrypt an out-bound message 114-2 to protect the message 114-2 from unauthorized access. The application 104 can decrypt an in-bound message 114-1 to gain access to the message 114-1. As used herein a decrypted message refers to a previously encrypted message and an un-encrypted message refers to a message that was not previously encrypted.

Gaining access to a message 114-1 can include decrypting the encrypted content of the message. For example, a third party can be denied access to a message even though the third party can obtain an encrypted message and can obtain the encrypted content of the message 114-1 but cannot decrypt it. The application 104 can gain access to a message by decrypting the encrypted content of the message.

The application 104 can use a number of encryption schemes to encrypt and/or decrypt a message. In FIG. 1, the application 104 can encrypt and/or decrypt the messages 114-1 and 114-2 using an encryption key 108. The encryption key 108 can be used in conjunction with a cryptographic algorithm, e.g., Advanced Encryption Standard (AES), to transform the un-encrypted content of the message to an encrypted content of the message and/or to transform the encrypted content of the message to a decrypted content of the message. The encryption key 108 can be generated in the application's environment, e.g., computing device 102-1. The encryption key 108 can be generated using a public/private key pair before being committed to persistent storage, e.g., stored in keystore 106. In a number of examples, an application 104 can encrypt a message 114-2, e.g., the content of the message 114-2, using one of a private and/or public key and can decrypt the message 114-1 using the other one of the private and/or public key. As used herein, examples using an encryption key 108 can be extended to use private and/or public key pairs.

The keystore 106 can store the encryption key 108 and can grant access to the encryption key 108. As used herein, a keystore 106 can be a repository that can store encryption keys and that can perform a number of encryption based operations on messages. Access to the encryption key 108 can be granted based on a password 112 to the keystore 106. For example, the application 104 can present the keystore 106 with a password 112 and the keystore 106 can grant the application 104 access to the encryption key 108 if the password 112 is associated with the encryption key 108.

The keystore 106 can be located, e.g., hosted, on a computing device 102-1 that is different than the computing device 102-2 that hosts the password 112. For example, the keystore 106 can be located on any computing device other than the computing device 102-2. Separating the storage location of the keystore 106, e.g., the computing device 102-1, from the storage location of the password 112 to the keystore 106, e.g., the computing device 102-2, can provide added security to the access of the encryption key 108.

The password 112 can be associated with a source 110. The source 110 can be a file, a directory, a link, and/or a container type. In FIG. 1, the source 110 is a file that is stored in a memory 116-2 that is location in the computing device 102-2. In a number of examples, the source 110 can be stored in a portable device and/or portable memory, e.g., universal serial bus (USB) flash drive. The source 110, e.g., source file, can contain the password in an un-encrypted state, e.g., plain text. In a number of examples, the source 110 can be created by IT personnel that are associated with managing the access that the application 104 has to the encryption key 108. The IT personnel can also manage the storage of the password 112 in the source 110. For example, IT personnel can create the source 110 and include the password 112 in the source 110 immediately before the application 104 requests access to encryption key 108. IT personnel can create the source 110 and include the password 112 in the source immediately before the application 104 requests access to the encryption key 108 when the IT personnel anticipate the request. IT personnel can anticipate the request, for example, when a request is part of a start-up sequence of the application 104. That is, the IT personnel can create the source 110 and the password 112 immediately before the start-up sequence of application 104. In a number of examples, IT personnel can create the source 110 and can include the encryption key 108 in the source before the application 104 requests access to the encryption key 108.

The application 104 can obtain access to the password 112 and can use a memory 116-1 to store the password 112. Examples of the use of memory 116 to store the password 112 are discussed in association with FIGS. 2, 3, and 4.

Figure 2:
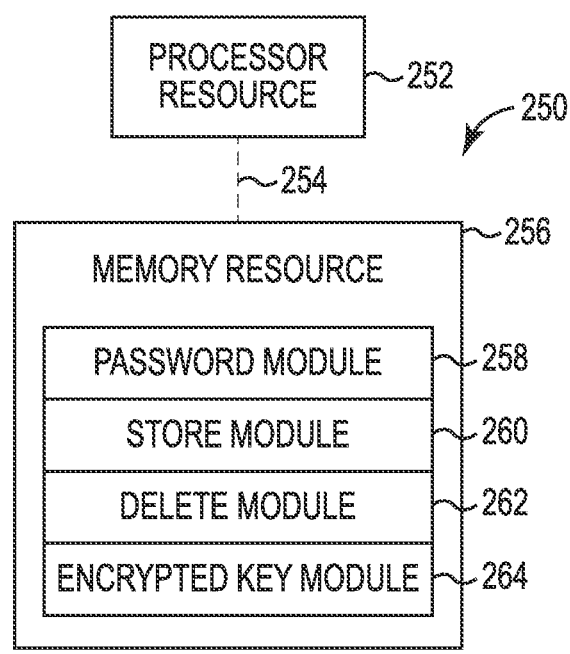
FIG. 2 illustrates a diagram of an example of a computing device according to the present disclosure.

FIG. 2 illustrates a diagram of an example of a computing device according to the present disclosure. The computing device 250 can utilize software, hardware, firmware, and/or logic to perform a number of functions described herein.

The computing device 250 can be any combination of hardware and program instructions configured to retrieve a key. The hardware, for example can include a processing resource 252 and/or a memory resource 256, e.g., machine readable medium (MRM), database, etc. A processing resource 252, as used herein, can include any number of processors capable of executing instructions stored by a memory resource 256. The processing resource 252 may be integrated in a single device or distributed across multiple devices. The program instructions, e.g., machine-readable instructions (MRI), can include instructions stored on the memory resource 256 and executable by the processing resource 252 to implement a desired function, e.g., retrieve an encryption key.

The memory resource 256 can be in communication with a processing resource 252. A memory resource 256, as used herein, can include any number of memory components capable of storing instructions that can be executed by processing resource 252. Such memory resource 256 can be a non-transitory MRM. The memory resource 256 may be integrated in a single device or distributed across multiple devices. Further, the memory resource 256 may be fully or partially integrated in the same device as the processing resource 252 or it may be separate but accessible to that device and processing resource 252. Thus, it is noted that the computing device 250 may be implemented on a participant device, on a server device, on a collection of server devices, and/or on a combination of the participant device and the server device.

The memory resource 256 can be in communication with the processing resource 252 via a communication link, e.g., path, 254. The communication link 254 can be local or remote to a machine, e.g., a computing device, associated with the processing resource 252. Examples of a local communication link 254 can include an electronic bus internal to a machine, e.g., a computing device, where the memory resource 256 is one of volatile, non-volatile, fixed, and/or removable storage medium in communication with the processing resource 252 via the electronic bus.

A number of modules 258, 260, 262, 264 can include MRI that when executed by the processing resource 252 can perform a number of functions. The number of modules 258, 260, 262, 264 can be sub-modules of other modules. For example, the password module 258 and the store module 260 can be sub-modules and/or contained within the same computing device. In another example, the number of modules 258, 260, 262, 264 can comprise individual modules at separate and distinct locations, e.g., MRM, etc.

Each of the number of modules 258, 260, 262, 264 can include instructions that when executed by the processing resource 252 can function as a corresponding engine as described herein. For example, the password module 258 can include instructions that when executed by the processing resource 252 can function as a password engine. In another example, the store module 260 can include instructions that when executed by the processing resource 252 can function as the memory engine.

In the example of FIG. 2, a password module 258 can comprise MRI that are executed by the processing resource 252 to retrieve a password for a keystore. An application can retrieve the password from a source. The application can be executing in a first computing device while the source can be in a second computing device. The source and/or a reference to the source can be provided to the application by IT personal. The application can retrieve the password from the source. In a number of examples, the source can be stored in portable memory that the IT personnel can plug into a computing device to provide the application with access to the source.

A store module 260 can comprise MRI that are executed by the processing resource 252 to store the password in memory. The application can store the password in memory that is associated with the first computing device. The memory that is associated with the first computing device can be system memory in the first computing device, for example. In a number of examples, the application can store the password in memory other than the memory associated with the first computing device as long as the application has access to the memory. For example, the application can store the password in non-system memory and/or in system memory that is associated with a different computing device. The application can store the password in system memory that is associated with a second computing device and/or in a USB flash drive. As used herein, the memory associated with the first computing device, e.g., computing device where the application is executing, can be volatile memory, e.g., DRAM, and/or non-volatile memory, e.g., hard drive.

A delete module 262 can comprise MRI that are executed by the processing resource 252 to delete the password from the source. The application can delete the password from the source. For example, the application can delete the password from the source by deleting the content of the source and/or by deleting the source. For example, if the source is a file, then the application can delete the file to delete the password and/or delete the content of the file to delete the password. If the source is a directory, then the application can delete the directory and/or the content of the directory to delete the password. If the source is a link, then the application can delete the destination that is associated with the link and/or delete the link. That is, the application can delete the password from memory that is associated with the second computing device. Unauthorized access to the password can be prevented by deleting the password from memory, e.g., deleting the password from the source.

An encryption key module 264 can comprise MRI that are executed by the processing resource 252 to retrieve an encryption key from a keystore using the password to the keystore. An application can present the password to the keystore. The keystore can provide a copy of the encryption key that is stored in the keystore to the application if the password is associated with the encryption key and/or access to the keystore. In a number of examples, the keystore can transfer the encryption key to the application without retaining a copy of the encryption key.

Figure 3:
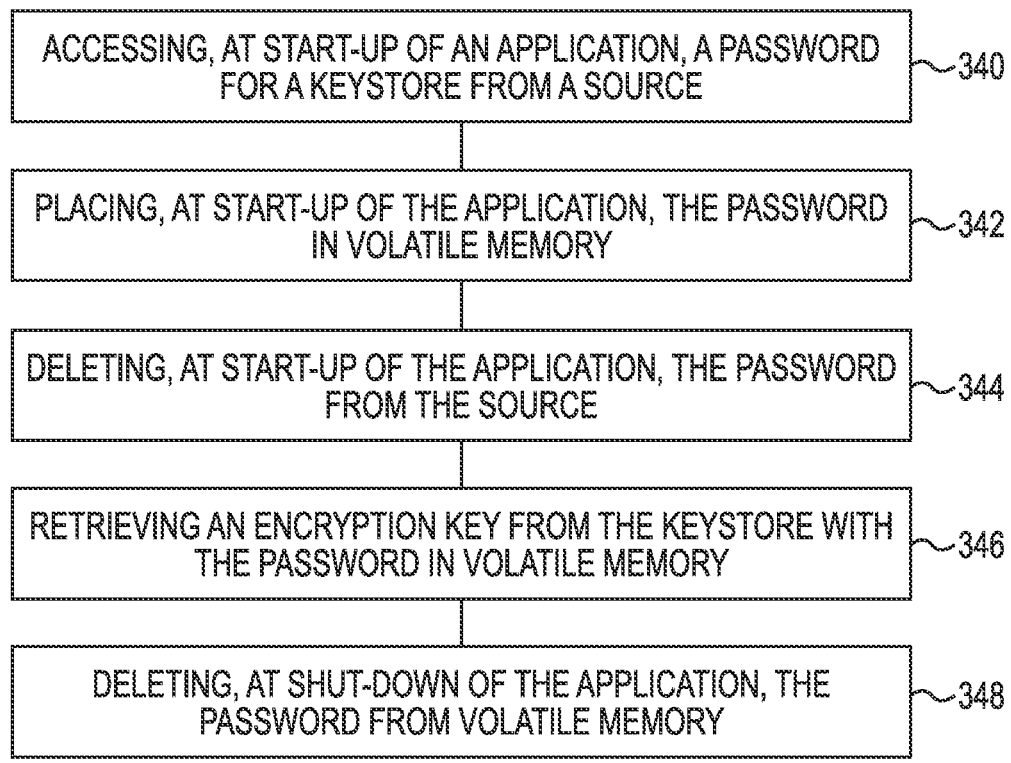
FIG. 3 illustrates a flow diagram of an example of a method for key retrieval according to the present disclosure.

FIG. 3 illustrates a flow diagram of an example of a method for key retrieval according to the present disclosure. At 340, an application can access a password for a keystore from a source at start-up of the application. A password can be accessed sooner by accessing the password at start-up than by accessing the password after start-up. Accessing the password at start-up can allow the application to delete the password from the source sooner than accessing the password after start-up. In a number of examples, the source can be stored in a different computing device than the computing device in which the keystore is stored. In a number of examples, the source can be stored in portable memory, e.g., USB flash drive. That is, the source does not have to be stored in a computing device.

At 342, the password can be placed in volatile memory at start-up of the application. The password can be placed in volatile memory, e.g., memory 116 in FIG. 1, that is associated with a first computing device where the application resides. In a number of examples, the encryption key can be used multiple times by the application while the application is executing on the first computing device. The encryption key can be retrieved at any time during the execution of the application because the password is stored in volatile memory and is accessible to the application. In some examples, the password is stored in volatile memory because once the password is deleted from a source access to the password is through the volatile memory.

At 344, the password can be deleted from the source at start-up of the application. Deleting the password from the source can ensure that the password is not accessible via the source.

At 346, the encryption key can be retrieved from the keystore with the password in volatile memory. An encryption key can be retrieved by the application to decrypt a message and/or to encrypt a message. The application can access the password in volatile memory and can provide the password, e.g., a copy of the password, to the keystore.

At 348, the password can be deleted from volatile memory at shut-down of the application. The password can be deleted from volatile memory at shut-down of the application to prevent unauthorized access to the password in volatile memory after the application shuts-down. For example, if the password is retained in volatile memory after the application shuts-down but while the first computing device is active then a third party may be able to gain unauthorized access to the keystore by scanning the volatile memory to obtain the password and by providing the password to the keystore.

A shut-down sequence can be a planned shut-down and/or an unplanned shut-down. An unplanned shut-down can occur when the application stops executing on the first computing device due to an error encountered during the execution of the application. An error encountered during the execution of the application can cause the application to cease functioning, e.g., crash. The application can delete the password from volatile memory as part of an unplanned shut-down sequence when the application ceases to function. In a number of examples, a different application and/or IT personnel can delete the password from volatile memory when the application ceases to function if the application was not able to delete the password from volatile memory as part of an unplanned shut-down sequence.

The application can delete the password form volatile memory during the course of a planned shut-down. A planned shut-down can occur when the application is given instructions to shut-down and/or when the application shuts-down voluntarily. For example, the application can delete the password from volatile memory where the application stored the password.

Figure 4:
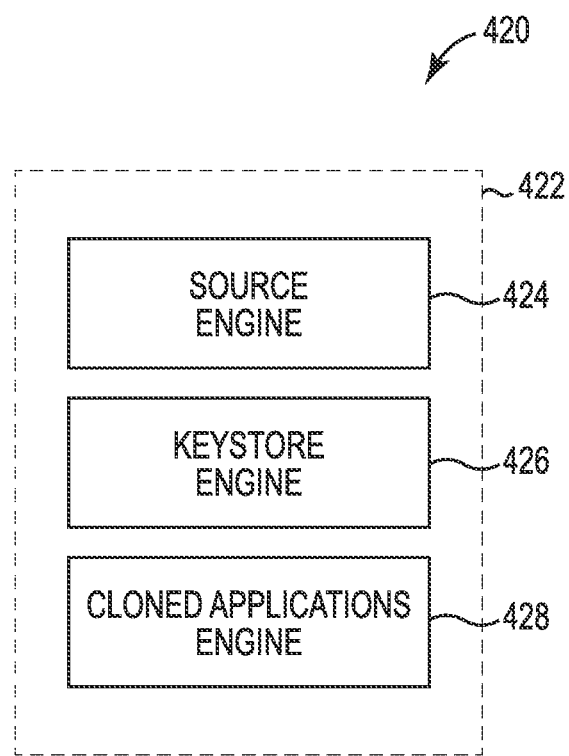
FIG. 4 illustrates a diagram of an example of a system for key retrieval according to the present disclosure.

FIG. 4 illustrates a diagram of an example of a system 420 for key retrieval according to the present disclosure. The system 420 can include a computing system 422, and/or a number of engines 424, 426, 428. The computing system 422 can include the number of engines, e.g., source engine 424, keystore engine 426, cloned applications engine 428, etc. The computing system 422 can include additional or fewer engines than illustrated to perform the various functions described herein.

The number of engines can include a combination of hardware and programming that is configured to perform a number of functions described herein, e.g., obtain a password from a source, provide the password to a keystore to obtain an encryption key, etc. The programming can include program instructions, e.g., software, firmware, etc., stored in a memory resource, e.g., machine readable medium, etc. as well as hard-wired program, e.g., logic.

The source engine 424 can include hardware and/or a combination of hardware and programming to create number of files that contain a password to a keystore. In a number of examples, each of the number of files, e.g., sources, can contain a same password, e.g., a number of copies of the password, to the keystore. The source engine 424 can create the number of files based on a number of parameters provided by IT personal. For example, IT personnel can provide a location wherein the number of files can be placed. The number of file can be saved in a same computing device and/or in a number of computing devices.

The keystore engine 426 can include hardware and/or a combination of hardware and programming to provide encryption keys. A keystore engine 426 can store a number of encryption keys in a keystore. A keystore engine 426 can provide the number of encryption keys to a number of applications. In a number of examples, a keystore engine 426 can perform a number of functions associated with an encryption scheme using the stored encryption key. For example, an application can request that a message be encrypted by presenting the message and an indication of a selected encryption key to the keystore. The keystore can encrypt the message using the selected encryption key and return an encrypted message to the application.

The cloned applications engine 428 can include hardware and/or a combination of hardware and programming to retrieve a password from the keystore. A number of applications can retrieve the number of passwords from the number of files. The number of applications can be a number of cloned applications. A number of cloned applications can be, for example, a number of applications wherein each of the applications has a same internal state associated with the application. For instance, a number of web servers can be cloned when each of the number of web servers hosts a copy of the same website, e.g., internal state. Each of the number of cloned applications can access a different one of the files to retrieve a copy of the password. In a number of examples, the number of cloned applications can be hosted on a same computing device and/or on a number of different computing devices.

Each of the cloned applications can save a retrieved password to volatile memory. For example, a first cloned application that is hosted on a first computing device can save the retrieved password in volatile memory that is associated with the first computing device while a second cloned application that is hosted in on second computing device can save the retrieved password in volatile memory that is associated with the second computing device.

After retrieving the password from the file and saving the password in volatile memory, each of the cloned applications can delete the password from a different one of the number of sources. For example, a first application that retrieved a password from a first source can delete the password from the first source and a second application that retrieved a password from a second source can delete the password from the second source. In a number of examples, each of the cloned applications cannot access a password that a different cloned application retrieved.

Each of the cloned applications can query the keystore via the password for an encryption key. The keystore can provide a copy of the same encryption key to each of the cloned applications because each of the cloned applications provided a same password to the keystore.

Each of the cloned applications can use the encryption key that was received from the keystore to encrypt a number of messages and/or decrypt a number of messages. Each of the cloned applications can delete a password from volatile memory. A cloned application can delete a password from volatile memory if the cloned application placed the password in volatile memory.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

As used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A non-transitory machine-readable medium storing instructions for key retrieval executable by a machine to cause the machine to:
    generate and encrypt an encryption key using a public/private key pair;
    store the encryption key in a keystore;
    access a password for the keystore from a source;
    place the password in volatile memory;
    delete the password from the source; and
    retrieve the encryption key from the keystore with the password in the volatile memory.

2. The medium of claim 1, wherein the instructions executable to retrieve the encryption key include instructions executable to retrieve the encryption key, by an application, to encrypt an outbound message.

3. The medium of claim 1, wherein the instructions executable to retrieve the encryption key include instructions executable to retrieve the encryption key, by an application, to decrypt an inbound message.

4. The medium of claim 1, wherein the instructions are executable to make the source accessible to a predetermined application that accesses the password.

5. The medium of claim 1, wherein the source is a file that contains the password.

6. The medium of claim 1, wherein the source is a link to a file that contains the password.

7. A method for key retrieval comprising:
    generating and encrypting an encryption key using a public/private key pair;
    storing the encryption key in a keystore;
    accessing a password for the keystore from a source;
    placing the password in volatile memory;
    deleting the password from the source;
    retrieving the encryption key from the keystore with the password in the volatile memory.

8. The method of claim 7, wherein accessing the password includes retrieving the password from a file that is located on a computing device on which the application is executing.

9. The method of claim 7, wherein accessing the password includes retrieving the password from a file that is located on a different computing device than a computing device on which the application is executing.

10. The method of claim 7, wherein deleting the password from the source includes deleting the source.

11. A system for key retrieval comprising a processing resource in communication with a non-transitory machine readable medium having instructions executed by the processing resource to implement a source engine, a keystore engine, and a cloned applications engine, wherein:
- the keystore engine to generate and encrypt an encryption key using a public/private key pair;
- the keystore engine to store the encryption key in a keystore;
- the source engine to create a number of sources that contain a password to the keystore; and
- the cloned applications engine to:
  - retrieve a password for the keystore from one of the number of sources for each of a number of cloned applications;
  - save the password in volatile memory;
  - delete the password from the one of the number of sources;
  - retrieve the encryption key from the keystore used to obtained a shared key with the password in the volatile memory; and
  - delete the password from the volatile memory.

12. The system of claim 11, wherein the cloned applications engine is configured to retrieve, by each of the number of cloned applications, a same password from a different one of the number of sources.

13. The system of claim 12, wherein the source engine is configured to include a copy of the password in each of the number of sources.

14. The system of claim 12, wherein the cloned applications engine is configured to retrieve, by each of the number of cloned applications, a same encryption key from the keystore using the same password.

15. The system of claim 11, wherein the cloned applications engine is configured to delete the password from one of the number of sources from which the password was retrieved.

16. The medium of claim 1, wherein the keystore is hosted on a computing device different than a computing device hosting the password.

17. The medium of claim 1, wherein the password is in an un-encrypted state.

18. The method of claim 7, further comprising placing the password in the source in response to a request to access the encryption key that is part of a start-up sequence.

19. The method of claim 7, wherein deleting the password from the source includes deleting content of the source.

20. The system of claim 11, wherein the keystore does not retain a copy of the encryption key after the encryption key is retrieved.

* * * * *